United States Patent [19]
Lee et al.

[11] Patent Number: 5,904,448
[45] Date of Patent: May 18, 1999

[54] FINISHING THROWAWAY BALL ENDMILL

[75] Inventors: Sang Wook Lee; Chang Hee Choi; Man Gyo Park, all of Daeku-si, Rep. of Korea

[73] Assignee: Korea Tungsten Co., Ltd., Daeku-si, Rep. of Korea

[21] Appl. No.: 08/915,725

[22] Filed: Aug. 21, 1997

[30] Foreign Application Priority Data

Aug. 21, 1996 [KR] Rep. of Korea .................. 1996/34651

[51] Int. Cl.$^6$ ..................................................... B26D 1/12
[52] U.S. Cl. ................................ 407/42; 407/34; 407/40; 407/49; 407/53; 407/54
[58] Field of Search ................................. 407/34, 40, 41, 407/42, 48, 49, 53, 54; 408/231, 232, 233, 713

[56] References Cited

U.S. PATENT DOCUMENTS

| | | | |
|---|---|---|---|
| 1,881,024 | 10/1932 | Lang | 408/713 |
| 2,400,856 | 5/1946 | Thompson | 407/48 |
| 2,575,239 | 11/1951 | Stephens | 408/233 |
| 4,060,335 | 11/1977 | Holloway et al. | 408/233 |
| 4,251,172 | 2/1981 | Durand | 407/54 |
| 4,493,596 | 1/1985 | Grunsky et al. | 408/713 |
| 4,566,828 | 1/1986 | Reinauer | 407/48 |
| 5,064,316 | 11/1991 | Stojanovski | 407/48 |

*Primary Examiner*—Frances Han
*Assistant Examiner*—Toan Le
*Attorney, Agent, or Firm*—Jacobson, Price, Holman & Stern, PLLC

[57] ABSTRACT

Finishing throwaway ball endmill has a blade tip adapted to make a firm attachment to a body thereof with easy. The endmill includes a body having a slot formed from an end thereof to a certain depth along an axis thereof, a wedge inserting hole formed in one side thereof and a screw inserting hole formed in the other side thereof both of which are in communication to the slot, and a wedge upper contact formed inside of the wedge inserting hole, a blade tip having a screw pass-through hole, the screw pass-through hole having a tapered wedge lower contact around an edge thereof, and the wedge inserting hole, the screw inserting hole and the screw pass-through hole being aligned when the blade tip is inserted in the slot in the body, a wedge having a fore end and a threaded hole formed in a direction of an axis thereof, the fore end having an upper sloped surface for contact with the wedge upper contact and a lower sloped surface for contact with the wedge lower contact when the wedge is inserted in the wedge inserting hole, and a screw for being threaded with a thread in the threaded hole through the screw inserting hole and the screw pass-through hole.

6 Claims, 10 Drawing Sheets

FINISHING THROWAWAY BALL ENDMILL

BACKGROUND OF THE INVENTION

1. Field of the Invention

The present invention relates to a finishing throwaway ball endmill used widely in machining of dies and in copying and profiling, and more particularly, to a finishing throwaway ball endmill which has a blade tip adapted to make a firm attachment to a body thereof with easy.

2. Discussion of the Related Art

In general, the throwaway ball endmill has a steel body and a cemented or sintered carbide blade tip screwed firmly on the body.

FIGS. 1~3 respectively illustrate a perspective disassembled view, and an assembled plane and a front views of an exemplary conventional finishing throwaway ball endmill.

This kind of conventional finishing throwaway ball endmill has two blade tips 2 and 3 of shapes different from each other screwed on both sides of the body 1 by screws 4. However, in this kind of throwaway ball endmill, each of the blade tips can not be securely fixed to the body 1 because it is fixed by only one screw, and the precision of the endmill is low because two different blade tips are fixed on the same body. And, as shown in FIG. 2, the removal of substantial portion of the body 1 for attachment of the blade tips 2 and 3 to form tip attaching parts 1a causes the body 1 weakened to generate vibration on the throwaway ball endmill, which subsequently causes breakage of the tips 2 or the screws loosened.

FIGS. 4 and 5 respectively illustrate a perspective disassembled view, and an assembled front view of another exemplary conventional finish throwaway ball endmill using two screws for fixing an unitary blade tip.

This kind of conventional throwaway ball endmill has, as shown in FIG. 4, a slot 11c formed in a body 11 from an end thereof to a certain depth along an axis of the body 11, and a blade tip 13 inserted in the slot 11c and fixed to the body 11 by two screws 15a and 15b of different shapes. In detail, the blade tip 13 has two screw pass-through holes 14a and 14b formed along the axis of the blade tip 13 and a V wedge 13a formed at a fore end thereof inserted in the slot 11c. The body 11 has screw pass-through holes 14a and 14b for the blade tip, screw inserting holes 12a and 12b formed opposite to the screw pass-through holes 14a and 14b, and a V bottom 11a formed to be matched to the V wedge 13a. Particularly, of the screws 15a and 15b, the screw 15a has a neck part (part without thread) 15c machined such that it can be precisely fitted to the screw pass-through hole 14a when the V wedge 13 on the blade tip 13 is closely fitted to the V bottom 11a in the body 11. Accordingly, when the blade tip 13 is inserted in the slot 11c in the body 11 and the two screws 15a and 15b are inserted into the screw inserting holes 14a and 14b and the screw inserting holes 12a and 12b and fastened, the blade tip 13 is fixed to the body 11. However, when the V bottom 11 in the body 11 is weared down from prolonged use, causing the V wedge 13a on the blade tip 13 can not make close contact with the V bottom in the body 11, the mounting of the blade tip 13 became unstable, thereby causing problems that the precision of the ball endmill is degraded and the rigidity of the body 11 is degraded due to stress concentration occurred at the ends of the V bottom 11a.

And, the machining of the two screw inserting holes 14a and 14b in the cemented or sintered carbide blade tip 13 causes the productivity low, and the attachment of the blade tip 13 with the two different screws 15a and 15b delays assembly of the ball endmill.

SUMMARY OF THE INVENTION

Accordingly, the present invention is directed to a finishing throwaway ball endmill that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the finishing throwaway ball endmill includes a body having a slot formed from an end thereof to a certain depth along an axis thereof, a wedge inserting hole formed in one side thereof and a screw inserting hole formed in the other side thereof both of which are in communication to the slot, and a wedge upper contact formed inside of the wedge inserting hole, a blade tip having a screw pass-through hole, the screw pass-through hole having a tapered wedge lower contact around an edge thereof, and the wedge inserting hole, the screw inserting hole and the screw pass-through hole being aligned when the blade tip is inserted in the slot in the body, a wedge having a fore end and a threaded hole formed in a direction of an axis thereof, the fore end having an upper sloped surface for contact with the wedge upper contact and a lower sloped surface for contact with the wedge lower contact when the wedge is inserted in the wedge inserting hole, and a screw for being threaded with a thread in the threaded hole through the screw inserting hole and the screw pass-through hole, thereby, as the screw is fastened, the upper sloped surface on the wedge is brought into contact with the wedge upper contact and the lower sloped surface is brought into contact with the wedge lower contact, whereby the blade tip is pressed downwardly to make a lower portion thereof to make a close contact with a bottom of the slot and, on the same time, a clamping force is exerted on the blade tip.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiment of the present invention, examples of which are illustrated in the accompanying drawings.

Figure 1:
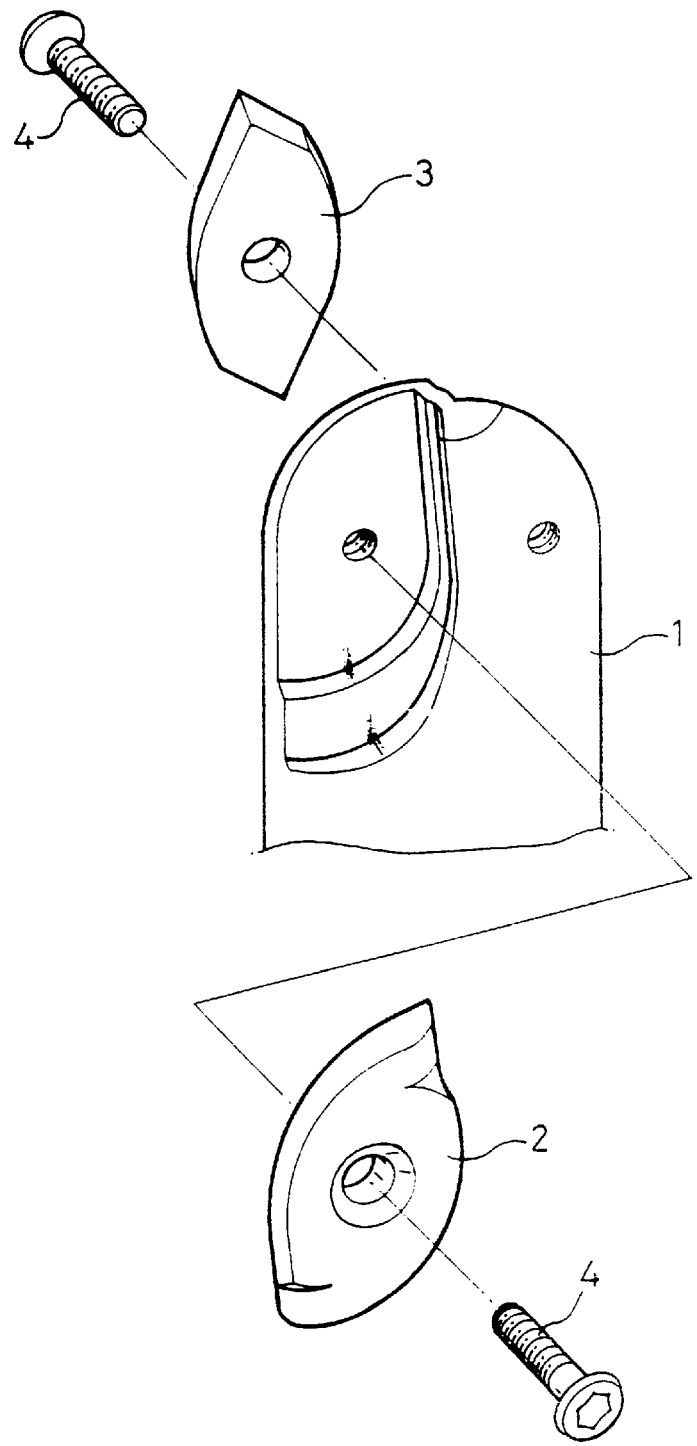
FIG.1 illustrates a perspective disassembled view of an exemplary conventional finishing throwaway ball endmill.
Figure 2:
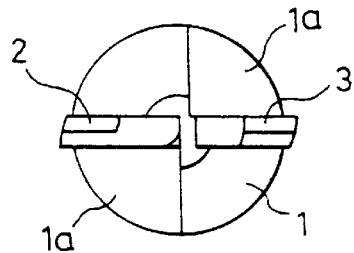
FIG. 2 illustrates a plane view of an assembly of the exemplary conventional finishing throwaway ball endmill shown in FIG. 1.
Figure 3:
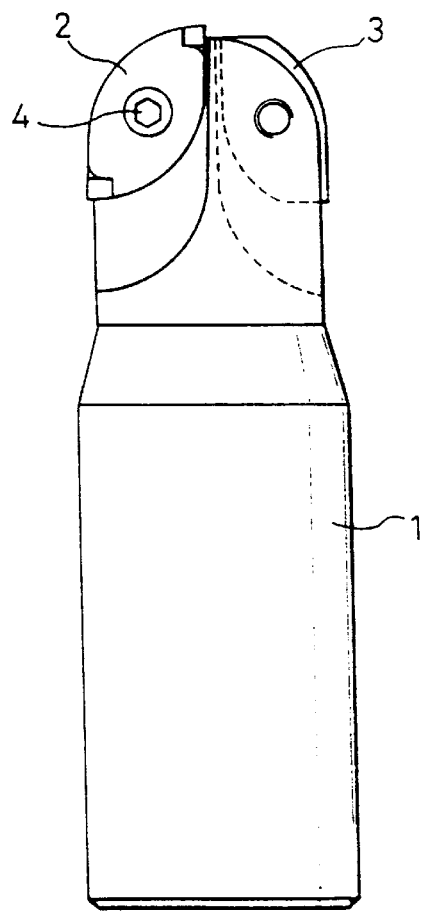
FIG. 3 illustrates a front view of an assembly of the exemplary conventional finishing throwaway ball endmill shown in FIG. 1.
Figure 4:
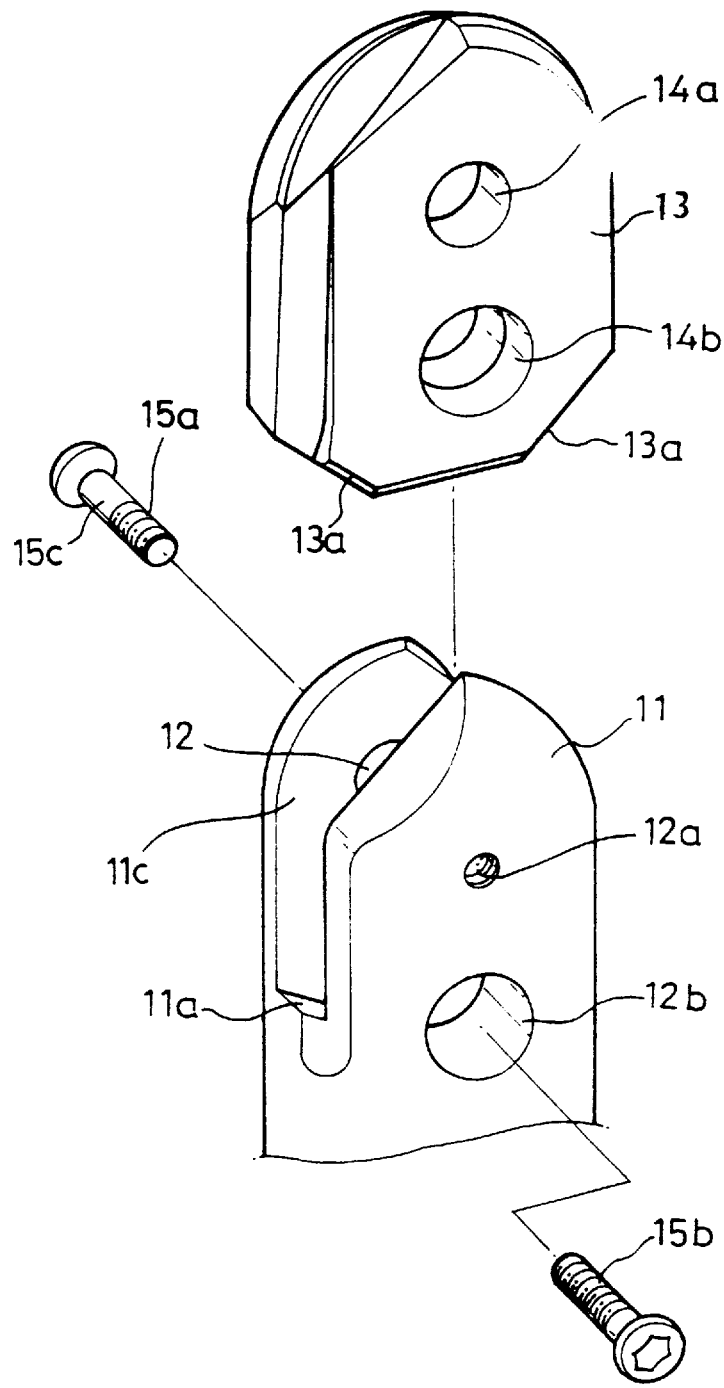
FIG. 4 illustrates a perspective disassembled view of another exemplary conventional finishing throwaway ball endmill.
Figure 5:
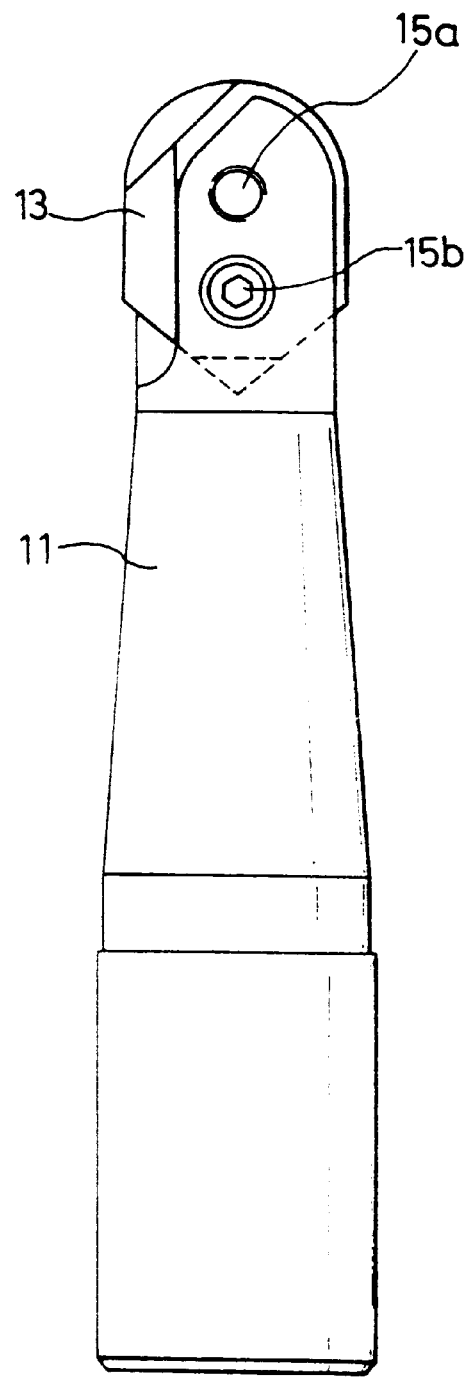
FIG. 5 illustrates a front view of an assembly of the another exemplary conventional finishing throwaway ball endmill.
Figure 6:
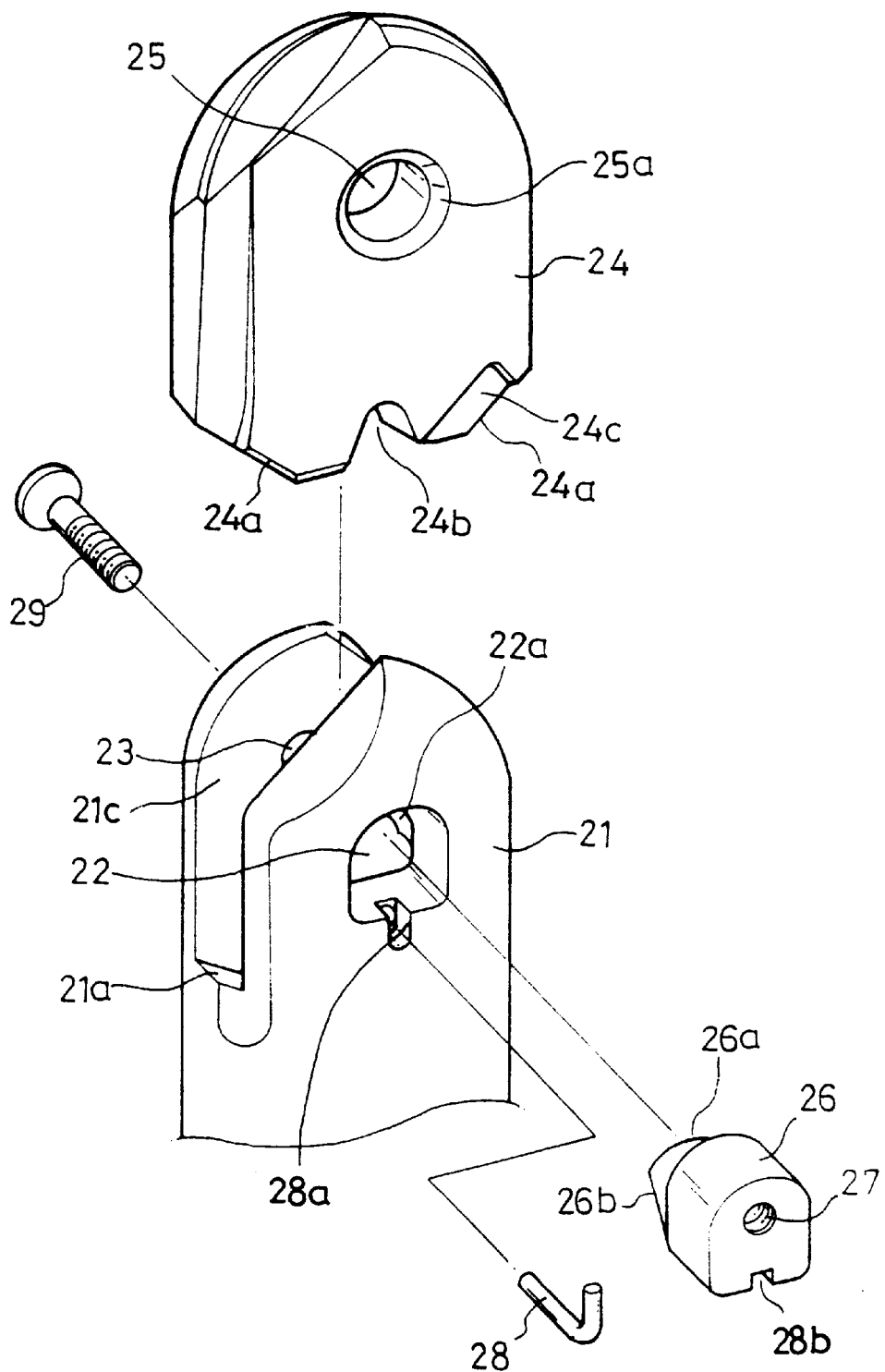
FIG. 6 illustrates a perspective disassembled view of a finishing throwaway ball endmill in accordance with a preferred embodiment of the present invention.
Figure 7:
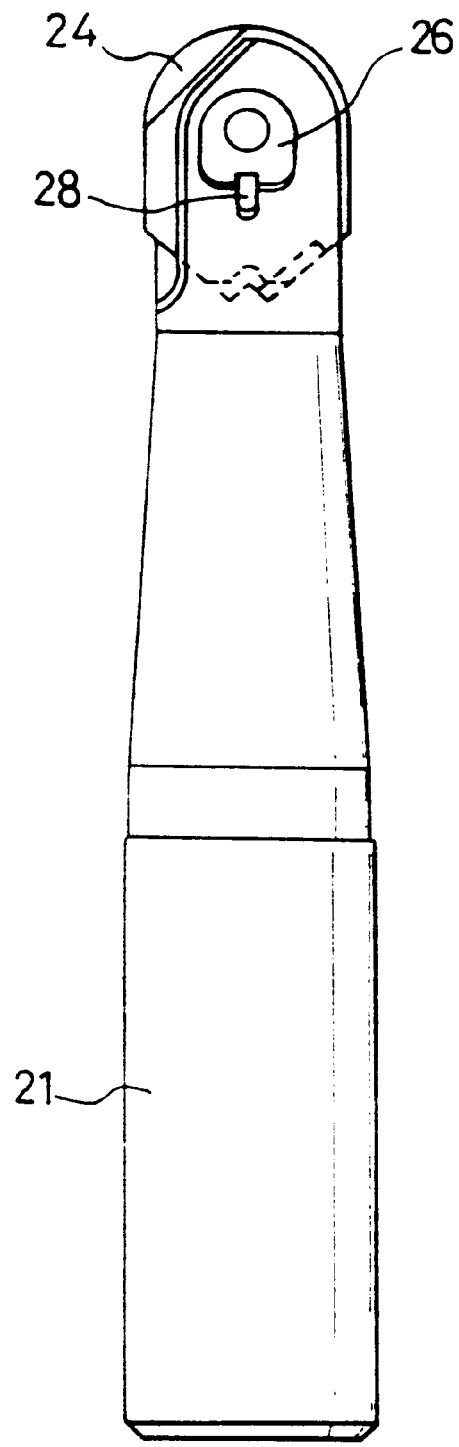
FIG. 7 illustrates a front view of an assembly of the finishing throwaway ball endmill shown in FIG. 6.
Figure 8:
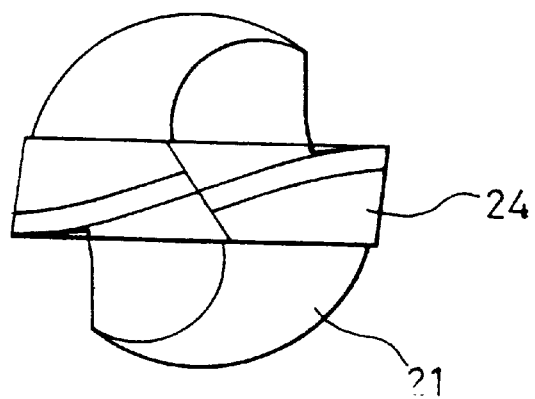
FIG. 8 illustrates a plane view of an assembly of the finishing throwaway ball endmill shown in FIG. 6.
Figure 9:
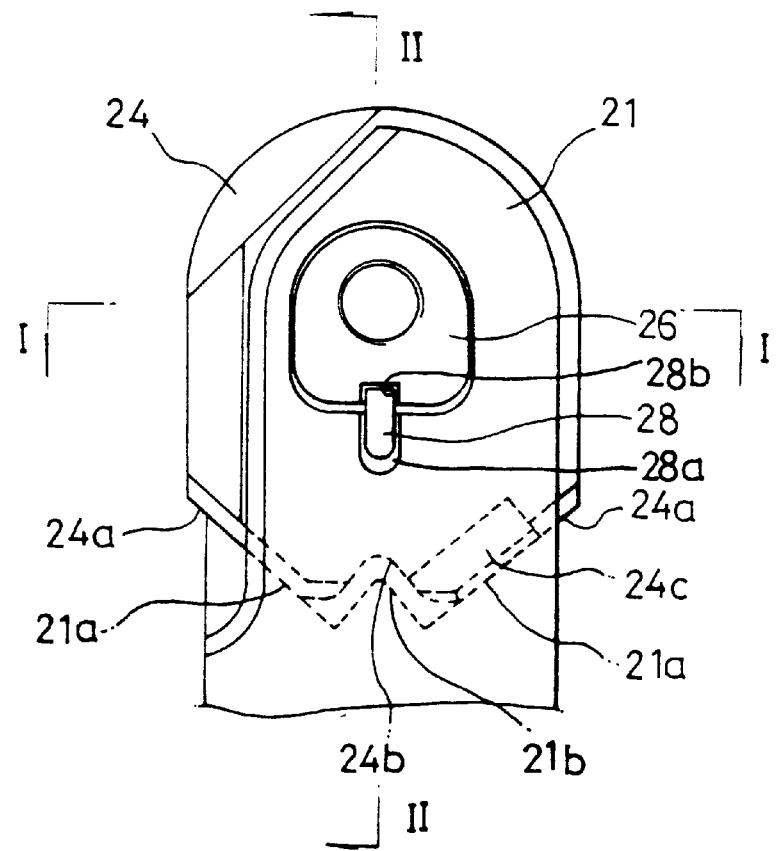
FIG. 9 illustrate a partial enlarge view of the finishing throwaway ball endmill shown in FIG. 7.

FIG. 6 illustrates a perspective disassembled view of a finishing throwaway ball endmill in accordance with a preferred embodiment of the present invention, FIG. 7 illustrates a front view of an assembly of the finishing throwaway ball endmill shown in FIG. 6, FIG. 8 illustrates a plane view of an assembly of the finishing throwaway ball endmill shown in FIG. 6, and FIG. 9 illustrate a partial enlarged view of the finishing throwaway ball endmill shown in FIG. 7.

Referring to FIGS. 6~9, the finishing throwaway ball endmill in accordance with a preferred embodiment of the present invention includes a body 21, a blade tip 24 inserted in the body 21, a conical eccentric wedge 26 inserted in one side of the body 21 for being in contact with the blade tip 24, and a screw 29 inserted in the other side of the body 21 and screwed with the conical eccentric wedge 26 for integrating the body 21, the blade tip 24 and the conical eccentric wedge 26 into one unit. The body 21 has a slot 21c formed from an end thereof to a depth thereof along an axis of the body 21, a wedge inserting hole 22 and a screw inserting hole 23 respectively formed in one side and the other side of the body so as to be in communication with the slot 21c, a wedge upper contact 22a formed inside of the wedge inserting hole 22 at an upper portion thereof, and a V bottom 24a formed at a bottom of the slot 21c for supporting the blade tip 24. The blade tip 24 has a screw pass-through hole 25 in communication with the wedge inserting hole 22 and the screw inserting hole 23 when the blade tip 24 is inserted in the slot 21c, a wedge bottom contact 25a formed tapered at an outer circumference of the screw pass-through hole 25 which is an interface between an outer surface of the blade tip 24 and the screw pass-through hole 25, and V wedge 24b formed at a bottom of the blade tip 24 in conformity with the V bottom 21a of the body 21.

Figure 12A:
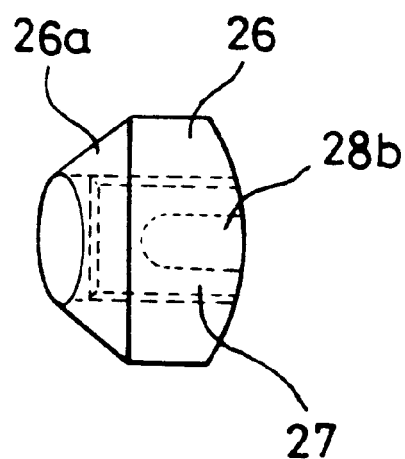
FIGS. 12a, 12b and 12c respectively illustrate plane view, right side view and back side view of the conical eccentric wedge shown in FIG. 6.
Figure 12B:
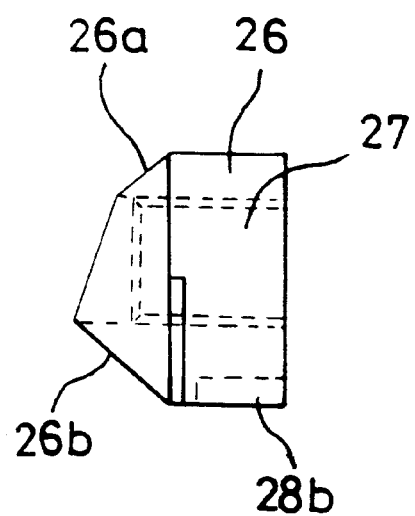
Figure 12C:
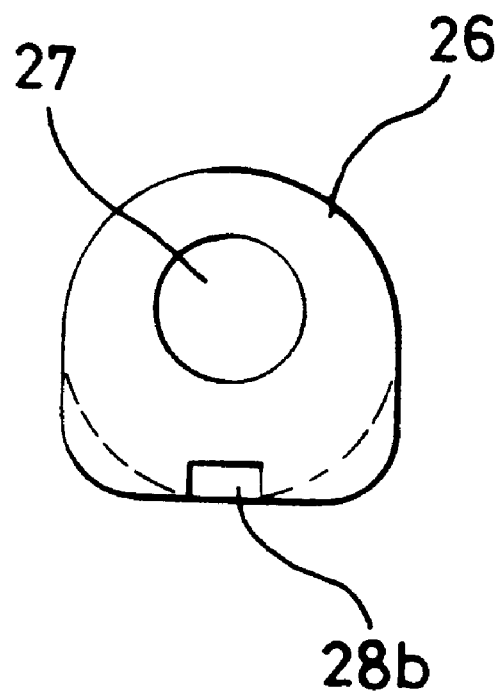

The conical eccentric wedge 26 is illustrated in detail in FIGS. 12a, 12b and 12c in plane, right side, and back side views.

Figure 10:
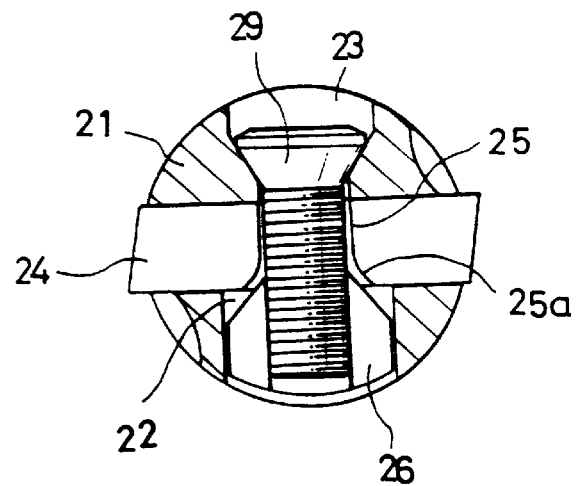
FIG. 10 illustrates a section across line I—I in FIG. 9.
Figure 11:
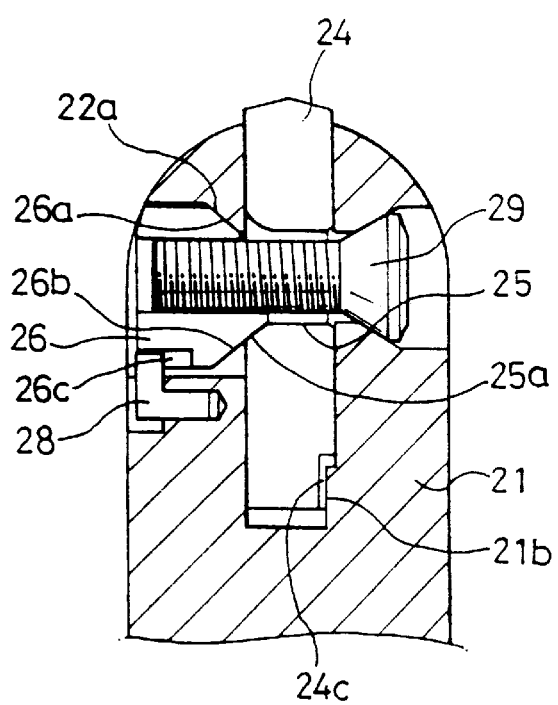
FIG. 11 illustrates a section across line II—II in FIG. 9.

Referring to FIGS. 12a~12c, the conical eccentric wedge 26 has a fore end portion with an upper sloped cam surface 26a for contact with the wedge upper contact 22a and a lower sloped cam surface 26b for contact with the wedge bottom contact 25a and a screw joining hole 27 formed in a direction of an axis of the conical eccentric wedge 26. Therefore, when the blade tip 24 is inserted in the body 21 and the conical eccentric wedge 26 is inserted in the wedge inserting hole 22, the fore end of the conical eccentric wedge 26 is advanced toward the screw pass-through hole 25 in the blade tip 24 such that the screw inserting hole 23 in the body 21, the screw pass-through hole 25 in the blade tip 24 and the screw joining hole 27 in the conical eccentric wedge 26 are aligned, allowing the screw jointed with the screw joining hole 27. When the screw 29 is fastened under this condition, the conical eccentric wedge 26 is moved toward the body 21. In this instance, as shown in FIG. 10 which illustrates a section across line I—I in FIG. 9 and FIG.11 which illustrates a section across line II—II in FIG. 9, the upper sloped cam surface 26a of the conical eccentric wedge 26 is brought into contact with the wedge upper contact 22a of the conical wedge inserting hole 22, and the lower sloped cam surface 22b is brought into contact with the wedge bottom contact 25a of the blade tip 24. Under this condition, when the screw 29 is further fastened, the lower sloped cam surface 26b makes a closer contact to the wedge bottom contact 25a, pressing the blade tip 24 downwardly. Therefore, the V wedge 24a on the blade tip 24 is brought into contact with the V bottom 21 in the body 21 and slides, to align the blade tip 24 to a center axis of the body 21 accurately. On the same time, the upper sloped cam surface 26a is become to press the body 21, so that the body 21 exerts a strong clamping force onto the blade tip 24. That is, by means of only one screw 29 and the conical eccentric wedge 26, the blade tip 24 can be strongly clamped by the body 11, and, since the blade tip 24 can always be brought into close contact with the V bottom 21a by the screw 29, even if there is a wear down of the V bottom 21a atter prolonged use of the endmill, the V wedge 24a on the blade tip 24 can be brought into close contact with the V bottom 21a by further fastening the screw 29, thereby the present invention allows to obtain a precise finishing throwaway ball endmill. And, as shown in FIG. 9, it is preferable that a recess 24b in a bottom of the V wedge on the blade tip 24 and a protrusion 21b on the V bottom 21a in the body 21 in conformity with the recess 24b are further provided for preventing the body 21 from being weakened by the V bottom 21a. And, as shown in FIG. 11 in detail, it is preferable that a projection 21b is further provided on a lower side of inside wall of the slot 21c in the body 21 and a cut-away recess 24c is further provided in one side of the blade tip 24 in correspondence to the projection 21b, for preventing insertion of the blade tip 24 into the body 21 in an opposite direction in an assembly of the endmill. Moreover, it is preferable that a safety pin 28 is further provided, one end of which is fixed to the body 21 and the other end of which holds the conical eccentric wedge 26. That is, the safety pin 28 has a form of "L" so that one end thereof is press fitted into an inserting hole 28a formed in one side of the body 21 and the other end thereof is inserted into an inserting hole 28b formed in the conical eccentric wedge 26 for holding the conical eccentric wedge 26 in place. Therefore, even if the screw 29 is loosened due to the vibration occurred during use of the finishing throwaway ball endmill, the fall off of the blade tip 24 from the body 21 can be prevented because the conical eccentric wedge 26 is held in place by the safety pin 28.

As has been explained, as the present invention allows not only the firm fixing of a blade tip onto a body of an endmill by means of a single screw and a conical eccentric wedge but also the continuous close contact of the blade tip onto the body, the present invention permits to obtain a precise throwaway ball endmill.

And, the formation of only one screw pass-through hole in the blade tip facilitates improvement in productivity because the machining of the blade tip becomes easier, formation of a stronger blade tip, and easy attaching/detaching of the blade tip to/from the body of the endmill.

Moreover, the provision of the projection on the body reinforces a rigidity of the body and help to reduce vibration, and the safety pin prevents fall off of the blade tip from the body.

It will be apparent to those skilled in the art that various modifications and variations can be made in the finishing throwaway ball endmill of the present invention without departing from the spirit or scope of the invention. Thus, it is intended that the present invention cover the modifications and variations of this invention provided they come within the scope of the appended claims and their equivalents.

What is claimed is:

1. A finishing throwaway ball endmill comprising:

a body having a slot formed from an end thereof to a certain depth along an axis thereof, a wedge inserting hole formed in one side thereof and a screw inserting hole formed in the other side thereof both of which are in communication to the slot, and a wedge upper contact formed inside of the wedge inserting hole;

a blade tip having a screw pass-through hole, the screw pass-through hole having a tapered wedge lower contact around an edge thereof, and the wedge inserting hole, the screw inserting hole and the screw pass-through hole being aligned when the blade tip is inserted in the slot in the body;

a wedge having a fore end and a threaded hole formed in a direction of an axis thereof, the fore end having an upper sloped surface for contact with the wedge upper contact and a lower sloped surface for contact with the wedge lower contact when the wedge is inserted in the wedge inserting hole; and, a screw for being threaded with a thread in the threaded hole through the screw inserting hole and the screw pass-through hole, thereby, as the screw is fastened, the upper sloped surface on the wedge is brought into contact with the wedge upper contact and the lower sloped surface is brought into contact with the wedge lower contact, whereby the blade tip is pressed downwardly to make a lower portion thereof to make a close contact with a bottom of the slot and, on the same time, a clamping force is exerted on the blade tip.

2. A finishing throwaway ball endmill as claimed in claim 1, further comprising a protrusion formed on a fore end of a V bottom of the bottom of the slot which supports the blade tip and a recess formed in a fore end of a V wedge portion of the lower portion of the blade tip to make a close contact with the protrusion on the V bottom.

3. A finishing throwaway ball endmill as claimed in claim 1, further comprising a projection formed on an one side inside wall of the body in the slot and a cut-away portion formed in the other side of the blade tip opposite to the projection.

4. A finishing throwaway ball endmill as claimed in claim 3, further comprising a safety pin having one end fixed to the body and the other end holding the wedge.

5. A finishing throwaway ball endmill as claimed in claim 4, wherein the safety pin has a form of "L".

6. A finishing throwaway ball endmill as claimed in claim 4, further comprising a safety pin inserting hole formed on side of the body for press fitting the one end of the safety pin thereto and a safety pin inserting recess for inserting the other end of the safety pin.

* * * * *